Feb. 27, 1951 L. J. KAMM 2,543,694

HELICOID SWITCH UNIT FOR SIGNALING SYSTEMS

Filed Aug. 8, 1947 2 Sheets-Sheet 1

INVENTOR.
LAWRENCE J. KAMM

BY [signature]

ATTORNEY.

Feb. 27, 1951 L. J. KAMM 2,543,694

HELICOID SWITCH UNIT FOR SIGNALING SYSTEMS

Filed Aug. 8, 1947 2 Sheets-Sheet 2

INVENTOR.
LAWRENCE J. KAMM

BY

ATTORNEY.

Patented Feb. 27, 1951 2,543,694

UNITED STATES PATENT OFFICE 2,543,694

HELICOID SWITCH UNIT FOR SIGNALING SYSTEMS

Lawrence J. Kamm, Yonkers, N. Y., assignor to The Teleregister Corporation, New York, N. Y., a corporation of Delaware Application August 8, 1947, Serial No. 767,623

7 Claims. (Cl. 235—92)

This invention relates to add-subtract registers, and has particular reference to a device for storing a number which represents an algebraic sum.

A practical embodiment of my invention is found to be particularly useful where a large number of register units is assembled into a panel and arranged for remote control operation, as by means of a keyset and associated selecting and actuating circuits.

The number to be stored represents any desired accumulation of items of positive and negative value. For example, the register may be used to indicate a reservation of seats on an air transport plane. Different registers would represent different flights. The reservations as made would be registered by transmitting a corresponding number of add-pulses to the register unit, thereby to advance the same step-by-step. The count of seats reserved may at any time be reduced by the transmission of a subtract-pulse or pulses representing cancellations. The invention is not limited to such use, however, since it may be applied quite generally to systems which require storing the algebraic sum of a limited number of items up to a count of, say 99 or more.

A feature of the invention is the design of the register unit so that it will occupy the smallest possible space consistent with ruggedness and dependability of structure. This is important where a large number of registers is to be comprised in a single panel. In a given register unit the arrangement of its parts for mutual cooperation is one of simplicity, thus providing an article which is of low manufacturing cost and is relatively free from maintenance costs.

Another feature is the provision for using the register as an "answer-back" signaling device. Whenever a report is wanted on the question of whether or not the count of stored items has reached a predetermined limit, the register itself provides the answer by causing a remote indication to be made. The exact count of stored items may also be read at any time by observing the setting of a certain indicating member which is arranged to present one of the ten numerals to a stationary scale bearing graduations which correspond to the tens digit of the number.

It is a principal object of my invention to provide a counting register having the features which are outlined in the preceding paragraphs.

Another object is to provide a register system, including signaling means associated therewith, whereby the count of a series of add-pulses and/or subtract pulses may be stored for any period of time and made available during that period for indicating whether or not the algebraic sum of the pulses has reached a predetermined value.

Other objects and advantages will be brought out in the more detailed description to follow. This description is accompanied by drawings in which Fig. 1 shows in perspective the register unit, the components of which are arranged and conformed to a preferred design;

Figures 1, 2:
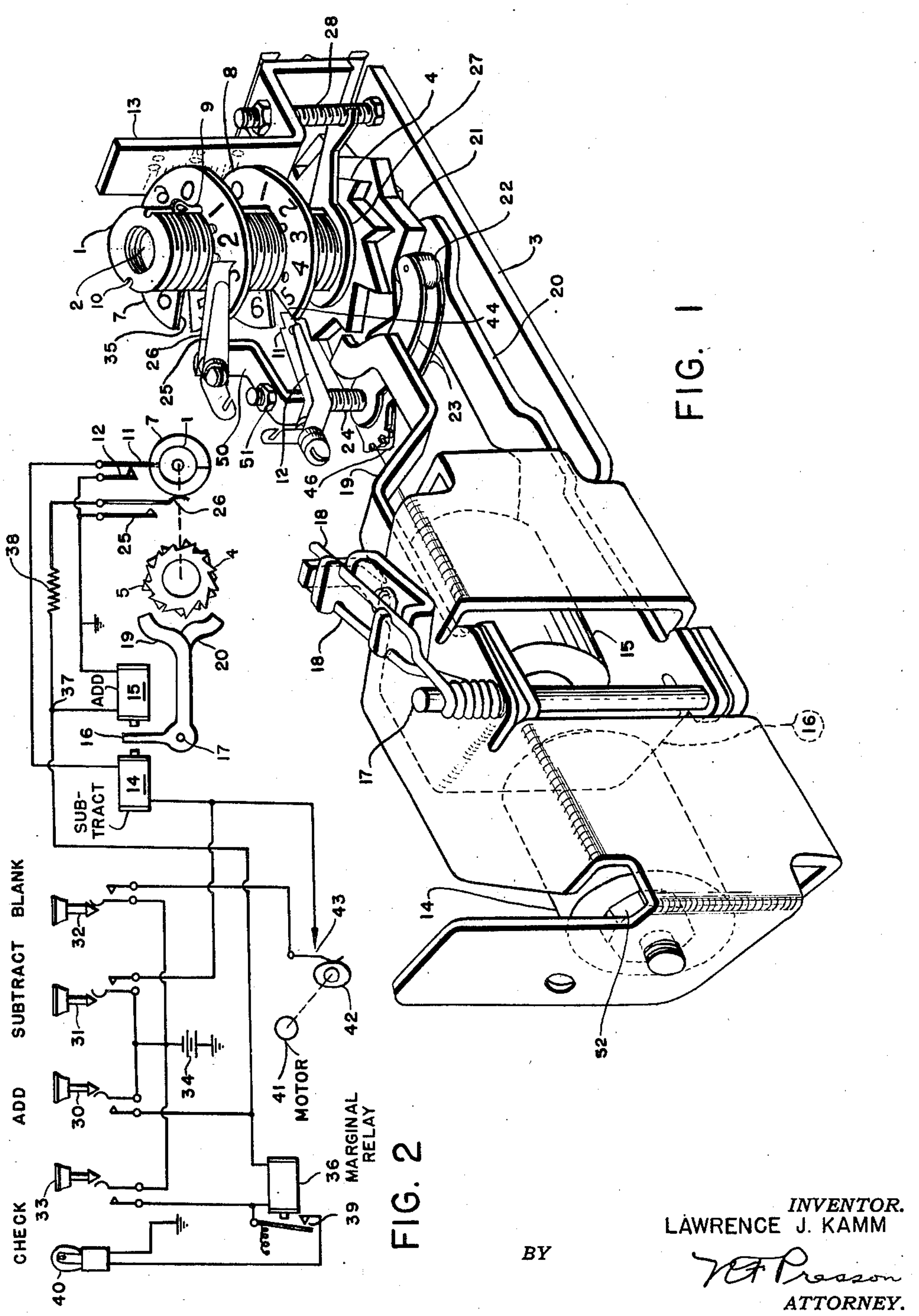
Fig. 2 shows diagrammatically a simplified circuit arrangement including the keys of a keyset and operating circuits for controlling the setting of a register such as shown in Fig. 1.

Referring first to Fig. 1, but also referring to any of the other figures in which details of the register unit may be more clearly seen, there is a settable cylinder 1 having internal and external threads and arranged to be screwed upwardly and downwardly on a stationary stud 2. Part of the cylinder is shown in section in Fig. 4 in order to expose its threaded engagement with the stud. The female threads of the cylinder are sufficient in extent to provide a good bearing surface while the cylinder is being turned. Above the female threads the cylinder has a friction-reducing bore. The diameter of the bore is such that it makes a slip fit with respect to the outside diameter of the threads on the stud 2.

The male threads of the cylinder extend from end to end. They serve to position two actuator washers 7 and 8 at suitable levels for engagement with different contact springs 26 and 11 respectively. Furthermore, said male threads of the cylinder serve to maintain a retaining ring 27 at constant level while the cylinder is turned. The ring 27 is internally threaded and is restrained from turning.

Figure 4:
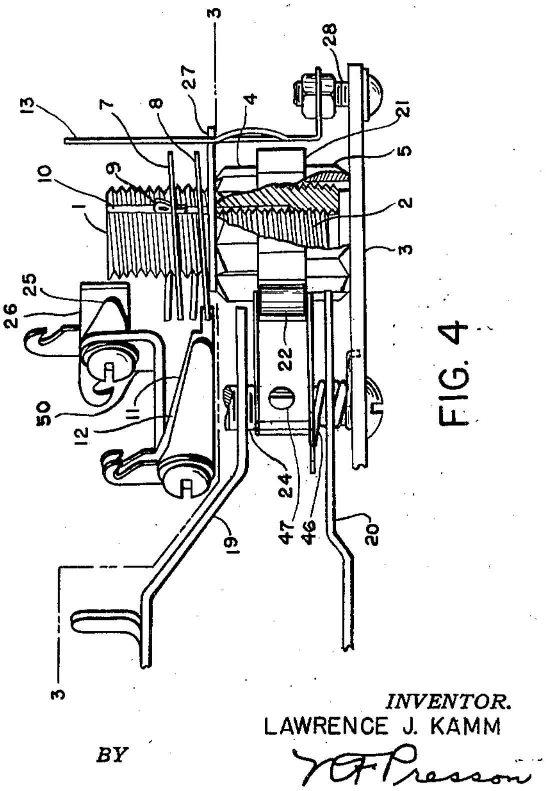
Fig. 4 shows a side view in elevation of the register unit.

The cylinder 1 fits freely into the pivot holes of two ratchet wheels 4 and 5 and an intervening detent wheel 21. Nevertheless all of these elements 1, 4, 5, and 21 are keyed together so as to be rotated through the same angle in a setting operation. If desired, the members 4, 5, and 21 may be made in one piece. They provide the means for step-by-step operation in response to electrical pulses applied to one of two magnets 14 and 15. So the turning of the elements 1, 4, 5, and 21 causes the cylinder 1 to travel upwardly along the helical path of the screw thread. But elements 4, 5, and 21 are restrained from climbing. They are held at constant level by means of the threaded retaining ring 27 which was mentioned in the preceding paragraph. The internal and external threads of the cylinder are of the same pitch so that the ring 27 when restrained from turning will remain at constant level. Ring 27 has an extension arm which either straddles a stationary post 28 as shown in Fig. 1 or it may alternatively project through a hole in a scale member 13 as shown in Fig. 4.

Figure 8:
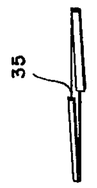
Fig. 8 shows an edgewise view of either of the actuators of Figs. 6 and 7. Where the nuts are split it will be seen that they are warped so that the edges at the split are offset.
Figure 5:
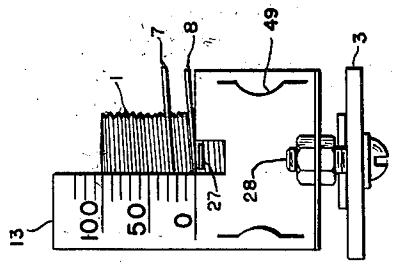
Fig. 5 shows a front view in elevation of the indicator scale and part of a settable member which serves to make indications.

The contact actuators 7 and 8 are formed as split washers. The holes therein are of suitable diameter to fit the thread groove of the cylinder 1, and require no tapping in order to be screwed thereon. So held they become slightly warped, as shown in Fig. 8. These contact actuators are keyed to the cylinder 1 by means of one or more keys 9. Lengthwise of the cylinder two diametrically opposed keyways 10 are provided. Each washer 7 or 8 has at least five internal keyways any one of which may be aligned with one of the keyways 10, thus permitting the washer to be locked in any one of ten angular positions with respect to any chosen one of the threads on the cylinder 1.

The primary function of the actuator 7 is to close a certain pair of contacts 25—26 when the cylinder 1 has been screwed upwardly by additive steps to a position representing a predetermined count of add-pulses. The actuator 7 first engages contact spring 26 when its upwardly warped split edge 35 reaches the same level as the lower edge of the spring. Further upward advancement of the cylinder 1 and actuator 7 is permissible if desired, and during this advancement the contact spring 26 rides the periphery of the actuator and remains in contact with spring 25.

Figures 3, 6, 7:
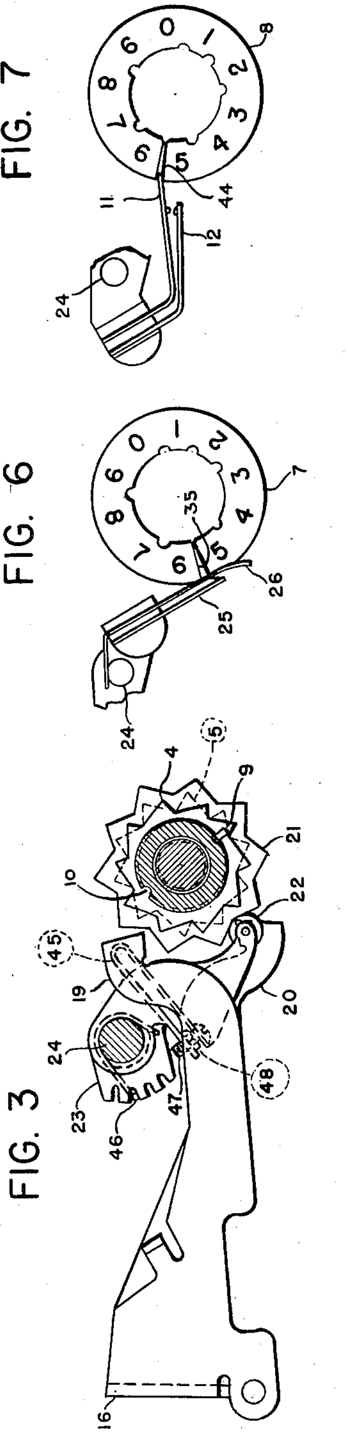
Fig. 3 shows a plan view of the register unit below the section line 3—3 of Fig. 4.
Fig. 6 shows a face view of an actuator formed as a split washer and cooperatively associated with a pair of contacts that are to be closed at a certain point of advancement of the settable member.
Fig. 7 shows another actuator similar to that of Fig. 6 but arranged for mounting on the settable member at a lower level and also arranged for opening a pair of contacts.

The lower actuator 8 is usually to be adjusted and locked in place on the cylinder 1 at the time of factory assembly. The adjustment is such as to bring its 0-numeral along-side the scale member 13 and at a level close to the 0-line on its scale when the cylinder has been screwed down on the stud not quite so far as it will go. In this position the offset edge 44 at the slit edge of the actuator 8 will bear against contact spring 11 as shown in Fig. 7, thus opening a circuit which is used to operate the subtract magnet 14. After making this adjustment the scale member 13 should be raised or lowered slightly and locked in place by means of nuts on a stud 28. Then the scale divisions of the member 13 provide a micrometer indication of the number of complete turns of the cylinder 1 and the actuator 8 away from a zero-setting. Also on being reset to the zero-position the opening of contacts 11 and 12 in a subtract-circuit causes the subtract magnet 14 to be disabled, as will be explained hereinafter.

The adjustment of the actuator 7 is to be made in accordance with a predetermined count of add-pulses applied for step-by-step advancement of the cylinder 1, where that count is to denote a given capacity, or limit of items to be totalized. Such a count may, for example, represent the seating capacity of an air transport plane.

Assume that this seating capacity is for 53 persons. The application of 53 add-pulses for screwing the member 1 upwardly through 5.3 turns of the screw thread will be registered micrometer-fashion and can be read by the position of the washer 8 with respect to the scale mark 50 and by the turning of numeral "3" on the washer 8 toward the edge of the vertical scale divisions. Upon reaching this setting the key 9 should be removed and the actuator washer 7 should be screwed upwardly or downwardly until its upwardly offset slit edge 35 just engages contact spring 11 to effect a break contact with its companion spring 12. The key 9 is now to be replaced in one of the keyways 10 and one of the notches in the washer 7. Thereafter the cylinder 1 may be stepped ahead (additively) or in reverse (subtractively) by any combination of add and subtract pulses and the algebraic total as stored in the register will always afford an opportunity for testing whether it is less than the total 53 or at least as great as the total 53.

Figs. 1 and 4 show one convenient arrangement for mounting the contact springs 11, 12, 25, and 26. By means of suitable insulation spacers and bushings, they are screwed to a bracket 50 which is supported on the screw 24 and locked in place by nuts 51.

The scale member 13 is preferably formed with slits 49. The shape and offset of the ears at these slits provide the means for holding an identification card, so that any one of numerous register units may be referred to individually.

The driving mechanism for setting the cylinder 1 includes two magnets 14 and 15, since the register itself is primarily intended for operation by remote control. The two magnets have a common armature 16 which is pivotally mounted on a post 17 and is resiliently held in neutral position by means of a spring 18.

The spring 18 is shown in Fig. 1 to be fastened to the pivot stud 17 for the armature 16. Centering of the armature in its neutral position is facilitated by an adjustable anchorage for the ends of the spring 18. This particular form of anchorage is optional, however, for other designs may be used if preferred. The armature 16 is preferably formed in one piece with two arms 19 adn 20. At the end of these arms are pawls one of which engages with the teeth of ratchet wheel 4 and the other engages with the teeth of ratchet wheel 5. Movement of the armature and pawl member in one direction causes the active pawl to drive its ratchet wheel part way through one step. The other pawl is drawn out of the orbit of its associated ratchet wheel.

The pawls are formed with their end-faces tangent to the arc through which their driving corners swing. At the end of a forward stroke one of these end-faces and one of the tooth faces of the associated ratchet wheel 4 or 5 are brought into abutment, thus preventing overdrive. At this point the detent roller 22 has already ridden over an apex of a tooth on the star wheel 21. So when the pawl is retracted by the action of spring 18, the ratchet wheels and star wheel are free to turn the remainder of the step. They are then driven by the pressure of the detent roller 22 toward the pivot center of the star wheel 21 until the roller 22 seats itself in the valley between two teeth.

The detent arm 23 which carries the roller 22 is preferably formed in one piece of flat stock, two arms extending in the direction of the roller 22 and arranged to straddle the same. Two other arms of the member 23 are threaded and screwed onto a post 24 as a pivot post. Around this post is a helical spring 46 which is anchored at one end by insertion into a hole in the base plate 3. The other end is inserted in a suitable one of several notches in the lower part of the detent member 23. Adjustability of the spring tension is provided by the choice of notches for the spring anchorage.

The purpose of the hair-pin loop in the detent arm 23 is to provide adjustability of the radial distance of the detent roller 22 from the pivot center of this arm 23. This is essential to the proper positioning of the ratchet wheels after completing any add-step or any subtract-step. Such positioning enables the pawls to engage their respective wheels with equal facility for taking either an add-step or a subtract-step.

The hair-pin loop is adjustably opened and closed by means of a screw 47 which turns freely in one hole in the loop and is screwed into a tapped hole in the opposite leg of the loop. A nut 48 locks the screw 47 after adjustment.

The two magnets 14 and 15 are adjustably mounted on upturned portions of the frame 3. Their cores are threaded to screw into tapped holes in the frame and are firmly attached thereto by means of lock-nuts 52.

Fig. 2 shows schematically a circuit arrangement for remote control of the register. Several keys 30, 31, 32, 33 are provided, each with a pair of contacts to be closed for performing the necessary operations upon the register and for checking its condition whenever desired. Each of the keys has a live contact connecting with a grounded direct current source 34. Another contact which is paired with each of the live contacts feeds to a suitable circuit for performing one of the desired functions.

The add-magnet 15 is controlled by the add-key 30. The add-circuit extends from the source 34 through contacts of add-key 30 and thence through the winding of the add-magnet 15 to ground. In like manner the subtract-magnet 14 is controlled by the subtract-key 31, the circuit therefor being traced from the source 34 through contacts of subtract-key 31, thence through the winding of the subtract-magnet 14, and through normally closed contacts 11 and 12 to ground. When a register is to be cleared, the blank-key 32 is depressed and this operates the subtract-magnet pulsatively. The circuit of the blank-key extends through contacts 43 which are pulsatively closed by a rotating cam 42 mounted on the shaft of a motor 41. Whenever subtracting steps are applied sufficient to drive the cylinder 1 down to its home or zero register position, contacts 11 and 12 are opened and the pulsating contacts 43 become ineffective. The blank-key 32 may then be released and the register will be in position to start a new count.

A check-key 33 is used to obtain an answer-back signal for indicating whether or not the register has been advanced to its predetermined limit, as would be shown by the closing of contacts 25 and 26. The check-key 33 closes a circuit through the add-magnet 15, the same as does the add-key 30, except that when the check-key 33 is depressed a marginal relay 36 is placed in series with the winding of the add-magnet 15. The combined resistance of the relay 36 and of the add-magnet 15 is too great to permit operation of either the relay 36 or the magnet 15 when their windings are in series. However, the marginal relay 36 is so biased that it will operate when the overall resistance of the circuit is reduced. This may be accomplished by closure of the contacts 25 and 26, so as to connect a resistor 28 in shunt with magnet 15. The value of resistor 38 is suitably chosen for causing relay 36 to operate and magnet 15 to be inoperative under conditions of contact closure between contacts 25 and 26, the check-key 33 being depressed.

The answer-back signal may be either visual or audible, but preferably is by means of a lamp 40, the circuit for which is closed through contacts 39 by the operation of relay 36.

The use of my improved add-subtract register is well illustrated by the way it would serve the needs of a reservations system. Assume, for example, that the ticket agent receives a request for three seats on a plane the flight of which, on a particular date, is assigned to the add-subtract register in question. Assume that 22 reservations have already been stored in the register and that the seating capacity of this plane is 24. The agent first depresses the check-key 33 after selecting and connecting the proper register to his keyset. No signal is given by the lamp 40, so it is thought that space is available. He depresses the add-key three times and again depresses the check-key to make sure he has not over-sold the space. The over-sold condition is now indicated by lighting the lamp 40. So space is offered on another plane and the over-sold condition of this particular register is corrected by depressing the subtract-key three times.

If it is desired to store an item above the capacity of the register, the add-key may still be used for storing supplemental items, even after it has been shown that the predetermined storage capacity has been reached. The supplemental items may, for example, be considered the registration of seats wanted but unavailable, as on a waiting list.

Although I have described a particular embodiment of my invention and have shown how it may be used practically in a reservations system, it will be understood by those skilled in the art that various modifications may be made, but without departing from the spirit and scope of the invention itself.

I claim:

1. A reversibly settable register in combination with remote control circuits therefor, said register being rotatable with axial displacement to follow the screw thread of a supporting stud, stepping mechanism for additive advancement of said register, stepping mechanism for subtractive setting of said register, each of said stepping mechanisms being subject to control by pulses transmitted through a respective one of said circuits, contacts closable by said register upon being stepped to a predetermined point of advancement, and means including a test key and a relay for producing a signal indicative of a setting of said register at or above said predetermined point of advancement, said key and relay having a circuit a portion of which is common to said remote control circuit for additive advancement of said register.

2. An algebraic totalizer for pulses of additive and subtractive significance comprising an internally and externally threaded member, a stationary threaded stud onto which said member is screwed, a contact actuator constituted as a thin split washer capable of being warped to fit within the groove of a single external thread of said member, keying means for locking said actuator in adjustably fixed relation to said member, means responsive to said pulses for turning said member step-by-step and directionally according to the additive or subtractive significance of said pulses, and an indicating circuit having contacts closable by said actuator upon its additive advancement to a position representing a predetermined algebraic total of said pulses.

3. The combination according to claim 2 and including a second contact actuator warped to fit the external threads of said member, and locked in adjustably fixed relation thereto, and another circuit having openable contacts one of which is mounted for engagement with said second actuator.

4. In a device for registering the algebraic summation effects of a number of pulses which are applied through two circuits, the pulses in one circuit having additive significance and the pulses in the other circuit having subtractive significance, a magnet in each circuit, an armature common to the two magnets, a rotatable member having two ratchet wheels arranged to be driven in opposite directions, means having two pawls each arranged and adapted to engage with a respective one of said ratchet wheels for driving the same step-by-step in the intended direction, said means being attached to, and movable with said armature, a threaded stud onto which said rotatable member is screwed, keying means for enabling said member and its ratchet wheels to be rotated together and for causing said member while rotating to follow the thread of said stud, means for maintaining said ratchet wheels in fixed axial relation to said stud during rotation, and means for causing said member to initiate a signal upon being advanced to a predetermined position by additive steps of said pawl means.

5. In a device for registering the algebraic summation effects of a number of pulses which are applied through two circuits, the pulses in one circuit having additive significance and the pulses in the other circuit having subtractive significance, a magnet in each circuit, an armature common to the two magnets, a rotatable member having two ratchet wheels arranged for being driven in opposite directions, means having two pawls each arranged and adapted to engage with a respective one of said ratchet wheels for driving the same step-by-step in the intended direction, said means being attached to, and movable with said armature, a threaded stud onto which said rotatable member is screwed, keying means for enabling said member and its ratchet wheels to be rotated together and for causing said member while rotating to follow the thread of said stud, means for maintaining said ratchet wheels in fixed axial relation to said stud during rotation, and means for causing said member, when driven to a limiting position by subtractive steps, to open the circuit through which pulses of subtractive significance are delivered.

6. A reversibly settable register in combination with remote control circuits therefor, said register being rotatable with axial displacement to follow the screw thread of a supporting stud, stepping mechanism for additive advancement of said register, stepping mechanism for subtractive setting of said register, each of said stepping mechanisms being subject to control by pulses transmitted through a respective one of said circuits, contacts closable by said register upon being stepped to a predetermined point of advancement, an answer-back circuit including said contacts and a test key for indicating whether the setting of said register is below said predetermined point of advancement or has reached said predetermined point of advancement.

7. An add-subtract register comprising a single settable member operable to store the cumulative effect of a series of applied counting pulses the capacity of said register for totalizing such pulses being at least 99, a stationary threaded stud on which said member is mounted for free turning to follow the thread thereof, step-by-step driving mechanism for setting said member additively or subtractively to register a new algebraic total of pulses, electromagnetic means for operating said driving mechanism, this means including an add-circuit and a subtract-circuit through which said counting pulses are applied, means controlled by said settable member for remotely indicating its advancement to or beyond a predetermined totalizing position, and further means controlled by said settable member for opening said subtract circuit, thereby to terminate a series of subtract-pulses which are applied for the purpose of restoring said settable member to a position of zero indication, a keyset having an add-key, a subtract-key, a check-key and a blank key, the add and subtract keys being operable respectively to close said add-circuit and said subtract-circuit, the check-key being cooperative with said means for remotely indicating a predetermined totalizing position of said settable member, and said blank key being operatively combined with continuous pulsing means for feeding pulses into said subtract-circuit, thereby to restore said settable member to a position of zero indication.

LAWRENCE J. KAMM.

REFERENCES CITED

The following references are of record in the file of this patent:

UNITED STATES PATENTS

| Number | Name | Date |
|---|---|---|
| 706,048 | Graham | Aug. 5, 1902 |
| 1,080,486 | Sheagren | Dec. 2, 1913 |
| 1,307,369 | Messiter | June 24, 1919 |
| 1,487,409 | Wallin | Mar. 18, 1924 |
| 1,747,734 | Peterson | Feb. 18, 1930 |
| 1,939,822 | Martin | Dec. 19, 1933 |
| 1,952,868 | Johnstone | Mar. 27, 1934 |
| 1,957,901 | Nehls | May 8, 1934 |
| 2,368,874 | Poole | Feb. 6, 1945 |
| 2,440,665 | Jeffrey | Apr. 27, 1948 |